(No Model.)

C. M. RAINS.
CULINARY UTENSIL.

No. 309,249. Patented Dec. 16, 1884.

Attest.
Robert C. Pugh.
John Connelly

Inventor.
Charles M. Rains
by Jno. S. Bushing
his Atty.

UNITED STATES PATENT OFFICE.

CHARLES M. RAINS, OF ABERDEEN, OHIO.

CULINARY UTENSIL.

SPECIFICATION forming part of Letters Patent No. 309,249, dated December 16, 1884.

Application filed December 22, 1883. (No model.)

*To all whom it may concern:*

Be it known that I, CHARLES M. RAINS, a citizen of the United States, residing in the city of Aberdeen, Brown county, State of Ohio, have invented certain new and useful Improvements in Culinary Utensils, of which the following is a specification.

My invention relates to vessels for cooking food, whereby the victuals are prevented from coming in contact with the iron pot and being scorched or burned; second, in so arranging an inner vessel within an outer one as to permit the food to be thoroughly drained of water, and at the same time to keep the victuals warm and in a proper condition for use.

Figure 1:
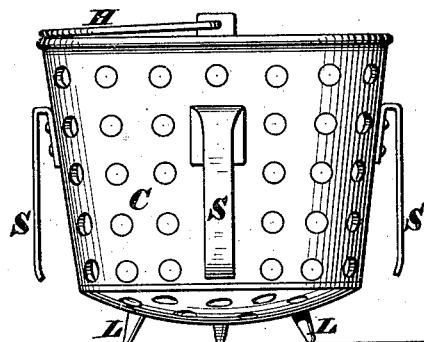
Figure 2:
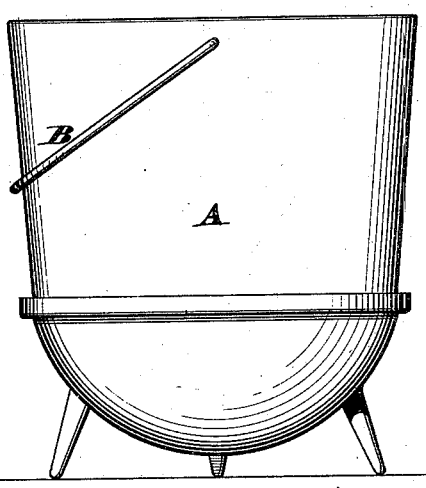
Figure 3:
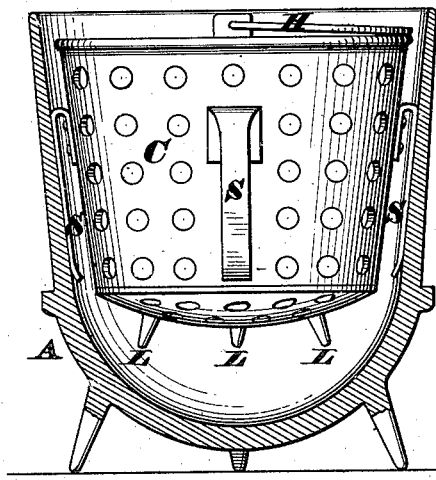
Figure 4:
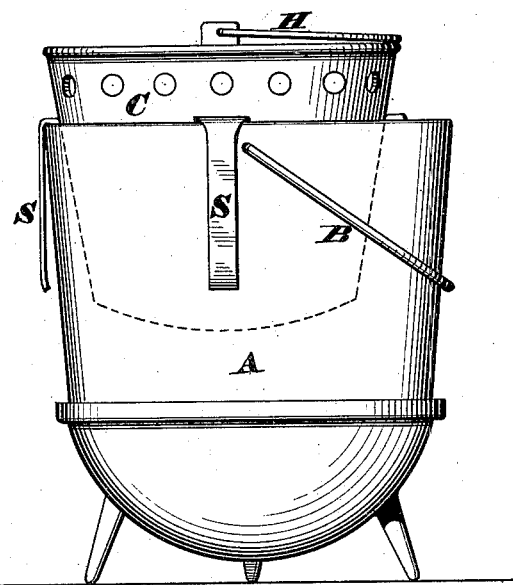

In the accompanying drawings, Figure 1 is a front view of my inner perforated pot or colander, showing the keepers or catches attached to the side thereof. Fig. 2 is a front elevation of an ordinary cooking-pot. Fig. 3 is a longitudinal section of the same, showing the perforated pot within it; and Fig. 4 shows the inner vessel hung to the top edge of the outer pot by means of the keepers.

A is an ordinary metal pot which comes in contact with the fire. B is the handle thereof.

C is a perforated vessel, preferably of tin, whose exterior shape is designed to accord with the interior of the pot A. In this vessel the food to be cooked is placed.

S S S are keepers attached to the side of the vessel C. The number of keepers may be varied; but I prefer four placed equidistant from each other, as that number subserves all the purposes to which they may be applied. These keepers are made of any material possessing elasticity, so that when the vessel C is placed within the vessel A they will hug the interior of the latter and allow the vessel to which they are attached to be withdrawn and replaced without difficulty, at the same time, in connection with the legs L L L, maintaining a space between the inner and outer vessels, as shown in Fig. 3, to allow a circulation of the water and steam around the colander C, thereby insuring the equal cooking of the victuals on all sides. If it is desired to drain the victuals, but not use them immediately, the inner vessel can be hung to the edge of the outer pot by means of one or more of the keepers S, as shown in Fig. 4, thus thoroughly draining off all water from the food and keeping it nicely warmed till ready for use. It will thus be seen that by means of this inner vessel or colander the food is not liable to become burned or scorched, as is so often the case with the cooking utensils used at the present time, while the arrangement of the keepers affords a great convenience for keeping the food warm and in good condition until ready for use.

H is the handle of the colander.

I am aware that culinary vessels have been used in which hinged feet and hinged hooks have been employed upon the inner perforated vessel, and such construction I do not claim, for the reason that in devices of that sort it is necessary, in order to hang the inner vessel to the outer one, to manipulate the hinged hooks or feet, (either or both,) while in my device the keepers, owing to their elasticity, spring out automatically and permit the attachment of the perforated vessel to the outer pot to be made at once; but What I do claim, and desire to secure by Letters Patent, is—

In a culinary utensil, the combination of a cooking-pot and its contained perforated vessel, the latter being provided with elastic keepers, as S, upon its sides, and rigid feet L on its bottom, substantially as and for the purpose described.

CHAS. M. RAINS.

Witnesses:
ROBERT C. PUGH,
JOHN CONNELLY.